Dec. 4, 1923.
L. A. KNOPP
1,475,955
WATER COOLED BRAKE RING
Filed Oct. 24, 1922
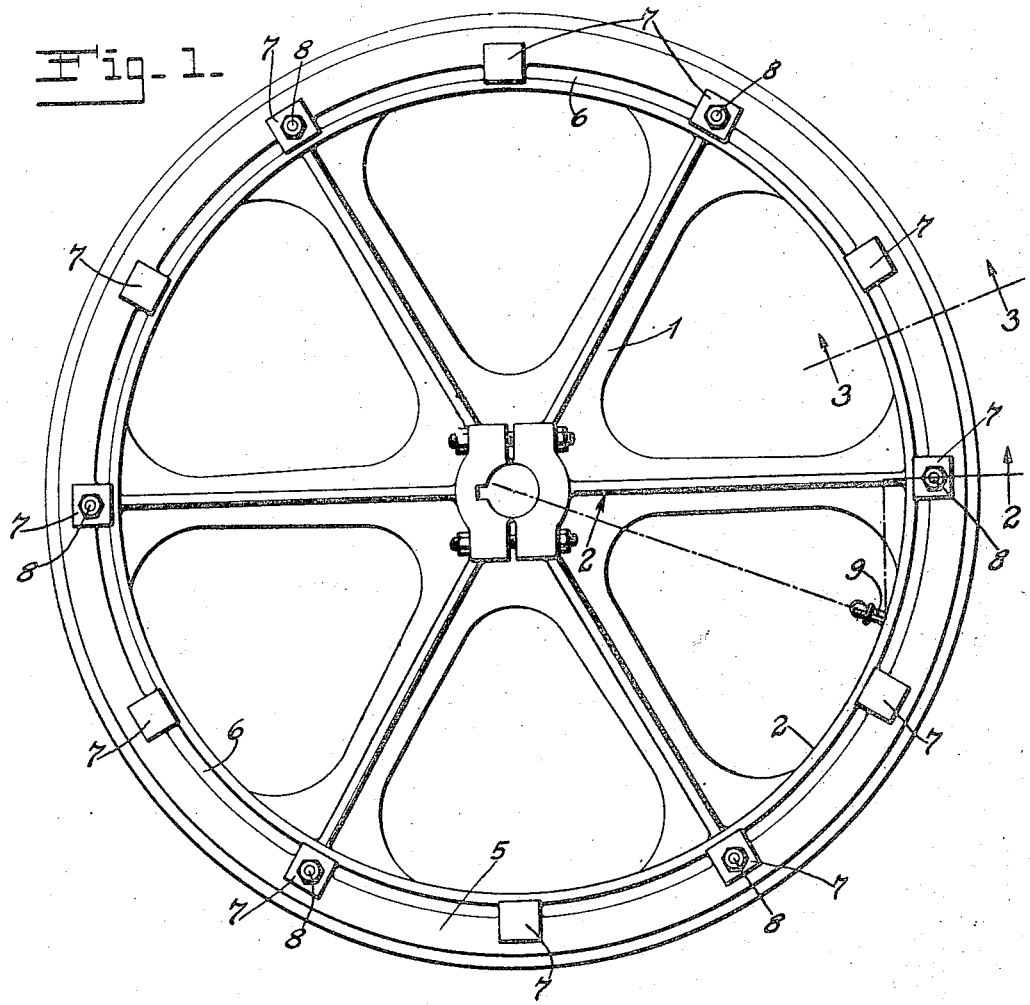
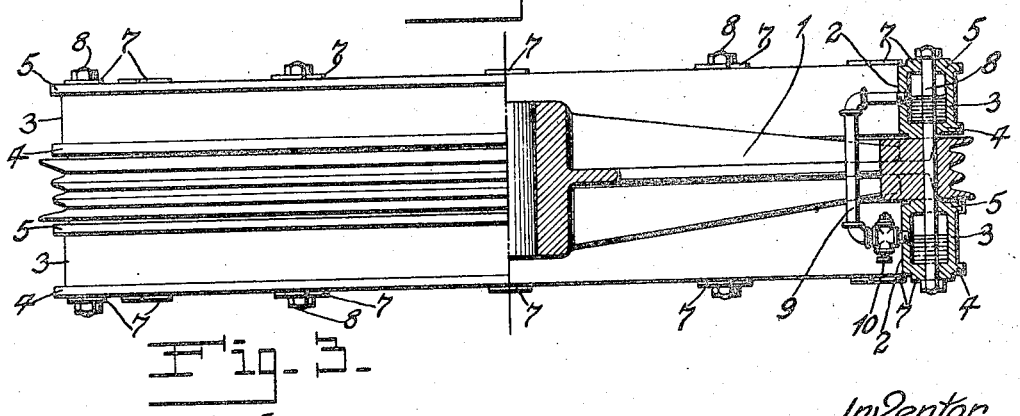
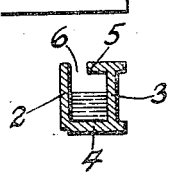
Inventor:
Louis A. Knopp,
by Rippey Kingsland
His Attorneys.

Patented Dec. 4, 1923.

1,475,955

UNITED STATES PATENT OFFICE.

LOUIS A. KNOPP, OF ST. LOUIS, MISSOURI, ASSIGNOR TO BRODERICK & BASCOM ROPE CO., OF ST. LOUIS, MISSOURI, A CORPORATION OF MISSOURI.

WATER-COOLED BRAKE RING.

Application filed October 24, 1922. Serial No. 596,555.

*To all whom it may concern:*

Be it known that I, LOUIS A. KNOPP, a citizen of the United States, residing at St. Louis, Missouri, have invented a new and useful Water-Cooled Brake Ring, of which the following is a specification.

This invention relates to a water-cooled brake ring, and consists in the novel construction and arrangement for utilizing water as cooling medium for the brake ring to prevent the burning out of the brake band lining.

An object of the invention is to provide an improved brake band ring constructed and adapted to utilize water as a cooling agent for the ring to prevent the ring from becoming heated to such an extent that it will burn out the brake band lining.

Other objects will appear from the following description, reference being made to the drawing in which—

Fig. 1 is a plan view of one form of the invention applied to a sheave wheel.

Fig. 2 is a sectional view on the zigzag line 2—2 of Fig. 1.

Fig. 3 is a sectional view of the brake ring on the line 3—3 of Fig. 1.

In the embodiment shown in the drawing the invention is applied to a sheave wheel of an aerial wire rope tramway. I do not restrict myself to such use of the invention, since the invention may well be applied to other uses.

As shown, the sheave wheel 1 is of familiar construction for operation upon a vertical axis. A brake ring is attached to each side of the sheave 1, the rings shown being of duplicate construction and each comprising an inner wall 2, an outer wall 3 to be engaged by the brake band, and a bottom wall 4 integrally uniting the inner and outer walls. The upper edge of each of the outer walls 3 is formed with an integral inwardly extending wall 5 that terminates some distance from the wall 2, leaving a space or slot 6. The walls 2 and 5 are integrally united at intervals by webs 7.

As shown (Fig. 2) two of the duplicate brake rings are used in connection with a central sheave wheel, one above and one below the sheave. The space or slot 6 in each of the brake rings is at the upper side so that in the lower brake ring the space or slot is toward the sheave wheel and opens inside the ring of the sheave wheel. The rings are attached to the sheave wheel by bolts 8 passing through said rings and through the wheel preferably, though not essentially, beyond the outer ends of the spokes of the wheel and through the webs 7.

A pipe connection 9 is provided from the upper brake ring to the lower brake ring. The pipe opens through the inner walls 2 of the brake rings about midway of their vertical width and is provided with a valve 10 for controlling the flow of the water from the upper brake ring to the lower one.

When water is poured into the upper brake ring through the slot 6 it rises therein to the opening into the pipe 9 and flows through said pipe into the lower brake ring. The brake rings should be filled to about the depth shown, so that when the sheave is rotated a ring of water will be formed by centrifugal force in each ring and the radial thickness of such ring of water will not exceed the width of the flange or wall 5. Should more water be contained in either of the brake rings than is required to form a ring of water of the radial thickness stated, the excess amount of water will be discharged through the slot 6. So long as the sheave wheel is in rotation the centrifugal force will maintain a cooling ring of water against each of the walls 3 around which the brake bands operate. In this way the rings are kept at a sufficiently low temperature so that they will not burn out the linings of the brake bands.

The rings being of duplicate construction may easily be applied, and removed when desired. In connection with the sheave wheel they form a strong assembly that accomplishes all of the intended purposes of the invention.

I am aware that the specific construction and arrangement may be varied without departure from the nature and principle of the invention. I do not restrict myself unessentially, but what I claim and desire to secure by Letters Patent is:—

1. A hollow rotary brake ring, comprising an inner wall and an outer wall surrounding the inner wall and forming a continuous annular space between said two walls adapted to contain water.

2. A hollow rotary brake ring, comprising inner and outer walls forming a continuous annular space, means for confining water between said walls, and a passage permitting escape of water from the annular space between said walls.

3. A hollow rotary brake ring, comprising inner and outer walls forming a continuous annular space, and a wall at an angle to the axis of said two walls uniting said inner and outer walls and forming therein a water confining space.

4. A hollow brake ring comprising inner and outer walls, a wall uniting the inner and outer walls and forming therewith a water confining space, and a wall extending from the outer wall toward the inner wall and terminating at a distance therefrom leaving a slot for discharge of water 5. A hollow brake ring comprising inner and outer walls, a radial wall uniting the inner and outer walls, a wall in connection with the outer wall extending toward and terminating at a distance from the inner wall, and spaced webs uniting said last named wall with said inner wall.

6. The combination with a sheave wheel, of a water-cooled brake ring attached to one side of the sheave wheel and comprising inner and outer walls, means for confining water between said walls, and a wall extending from the outer wall toward and terminating at a distance from the inner wall leaving a water discharging space.

7. The combination with a sheave wheel, of a water-cooled brake ring attached to one side of the sheave wheel and comprising inner and outer walls, means for confining water between said walls, a wall extending from the outer wall toward and terminating at a distance from the inner wall leaving a water discharging space, and webs integrally uniting said last named wall with the inner wall.

8. The combination with a sheave wheel, of two water-cooled brake rings located one at each side of said wheel and each comprising inner and outer walls, means for confining water between said walls, and means for determining the radial thickness of the water ring formed between said walls when said wheel is in rotation.

9. The combination with a sheave wheel, of two water-cooled brake rings located one at each side of said wheel and each comprising inner and outer walls, means for confining water between said walls, means for determining the radial thickness of the water ring formed between said walls when said wheel is in rotation, and a pipe for conducting water from one of said rings to the other.

LOUIS A. KNOPP.